(12) United States Patent
Ricketts et al.

(10) Patent No.: US 11,432,483 B2
(45) Date of Patent: *Sep. 6, 2022

(54) SYSTEM AND METHOD FOR CALIBRATING AN IRRIGATION SYSTEM

(71) Applicant: LINDSAY CORPORATION, Omaha, NE (US)

(72) Inventors: Michael George Ricketts, Palmerston North (NZ); Brian James Magnusson, Clarendon Hills, IL (US)

(73) Assignee: LINDSAY CORPORATION, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,425

(22) Filed: Oct. 1, 2020

(65) Prior Publication Data

US 2021/0022302 A1 Jan. 28, 2021

Related U.S. Application Data (63) Continuation-in-part of application No. 15/891,977, filed on Feb. 8, 2018, now Pat. No. 10,827,692.

(51) Int. Cl.
*A01G 25/16* (2006.01)
*A01G 25/09* (2006.01)
*B05B 12/08* (2006.01)
*B05B 12/12* (2006.01)

(52) U.S. Cl.
CPC .......... *A01G 25/16* (2013.01); *A01G 25/092* (2013.01); *B05B 12/085* (2013.01); *B05B 12/126* (2013.01)

(58) Field of Classification Search
CPC .... A01G 25/16; A01G 25/092; B05B 12/085; B05B 12/126
See application file for complete search history.

(56) References Cited

U.S. PATENT DOCUMENTS

| | | | |
|---|---|---|---|
| 4,637,547 | A | 1/1987 | Hiniker et al. |
| 5,927,603 | A | 7/1999 | McNabb |
| 6,236,907 | B1 | 5/2001 | Hauwiller et al. |
| 6,568,416 | B2 | 5/2003 | Tucker et al. |
| 6,666,384 | B2 | 12/2003 | Prandi |
| 6,705,553 | B2 | 3/2004 | Drechsel |
| 7,617,992 | B2 | 11/2009 | Ivans |
| 8,191,795 | B2 | 6/2012 | Grimm et al. |
| 8,443,822 | B2 | 5/2013 | Ivans |
| 8,720,803 | B1 | 5/2014 | Standley |
| 8,739,830 | B2 | 6/2014 | Bradbury et al. |

(Continued)

FOREIGN PATENT DOCUMENTS

EP 2633754 9/2013

OTHER PUBLICATIONS

International Search Report and Written Opinion dated Jan. 13, 2022 in related PCT Application No. PCT/US2021/051182, 13 pages.

*Primary Examiner* — Gary Collins
(74) *Attorney, Agent, or Firm* — Hovey Williams LLP (57) ABSTRACT

A system and method for calibrating an irrigation system to account for variations in flow rates, motor operating parameters, and other parameters caused by field elevation changes, pipe friction losses, water emitter nozzle wear, pressure-regulator inaccuracies, and other factors. A calibration map is created to account for the flow rate variations or other parameters and then consulted to control operation of the irrigation system.

16 Claims, 8 Drawing Sheets

(56) References Cited

U.S. PATENT DOCUMENTS

| | | | |
|---|---|---|---|
| 8,849,468 B2 | 9/2014 | Abts et al. | |
| 9,265,204 B2 | 2/2016 | Younis et al. | |
| 9,342,076 B2 | 5/2016 | Malsam et al. | |
| 9,363,956 B1 | 6/2016 | Standley | |
| 9,459,628 B1 | 10/2016 | Abts | |
| 10,109,024 B2 | 10/2018 | Bakke et al. | |
| 10,285,343 B2 | 5/2019 | Whalley | |
| 10,485,190 B2 | 11/2019 | Whalley | |
| 10,827,692 B2 | 11/2020 | Ricketts et al. | |
| 2002/0002425 A1 | 1/2002 | Dossey et al. | |
| 2007/0267524 A1 | 11/2007 | Mack | |
| 2011/0049260 A1 | 3/2011 | Palmer et al. | |
| 2011/0248104 A1 | 10/2011 | Malsam | |
| 2014/0263708 A1 | 9/2014 | Thompson et al. | |
| 2015/0134129 A1 | 5/2015 | Kidder | |
| 2017/0359974 A1 | 12/2017 | Whalley | |
| 2020/0193589 A1* | 6/2020 | Peshlov | G06N 3/0454 |
| 2021/0022302 A1 | 1/2021 | Ricketts et al. | |

* cited by examiner

SYSTEM AND METHOD FOR CALIBRATING AN IRRIGATION SYSTEM

RELATED APPLICATION

This is a continuation-in-part of U.S. application Ser. No. 15/891,977, filed Feb. 8, 2018, entitled SYSTEM AND METHOD FOR CALIBRATING AN IRRIGATION SYSTEM, which is hereby incorporated by reference into the present application in its entirety.

BACKGROUND OF THE INVENTION

1. Field of the Invention

The present invention relates to agricultural irrigation systems. More particularly, the invention relates to a system and method for calibrating an irrigation system to account for variations in water flow rates from the irrigation system.

2. Background

Agricultural irrigation systems such as central pivot and lateral move irrigation systems are commonly used to irrigate crops. A central pivot irrigation system typically includes, among other things, a central pivot communicating with a pressurized water supply and a main section that moves about the central pivot to irrigate a circular or semi-circular field. The main section includes a number of mobile support towers connected to the central pivot and to one another by truss-type framework sections. The mobile support towers are supported on wheels that are driven by a motor on each tower. A water distribution conduit is supported by the framework sections, and a number of sprinkler heads, spray guns, drop nozzles, or other water emitters are spaced along the length of the conduit for irrigating crops below the irrigation system. Lateral irrigation systems are similar except they don't include central pivots and move in a relatively straight line rather than a circle.

It is desirable to monitor and control the amount of water delivered by an irrigation system to prevent over or under-watering of crops and to conserve water. Similarly, it is often desirable to deliver different amounts of water to different portions of a field to accommodate different soil conditions, types of crops, and the existence of roads, boundaries, etc. in the field. Thus, it is common to divide a field into sections and to create an irrigation plan that calls for prescribed amounts of water to be delivered to each section. A control system then controls the speed of the mobile towers and/or the opening and closing of water valves to deliver the prescribed amounts of water to each section.

Unfortunately, even when following irrigation plans, irrigation systems often fail to accurately deliver prescribed amounts of water because field elevation changes, water pipe friction losses, water emitter nozzle wear, pressure-regulator inaccuracy, and other factors can cause variations in water flow rate, especially over time. Irrigation plans are typically created for expected flow rates from an irrigation system when it's on flat, level ground and therefore may call for too little water as the irrigation system travels up a hill (and water pressures drop) and too much water as the irrigation system operates in a valley (and water pressures increase). Moreover, irrigation plans are typically created when an irrigation system is first placed into service and become less accurate over time as pipes, valves, pressure regulators, water emitters and other components age.

SUMMARY

The present invention solves the above described problems by providing a system and method for calibrating an irrigation system to compensate for variations in flow rates caused by field elevation changes, pipe friction losses, water emitter nozzle wear, pressure-regulator inaccuracies, and other factors. In general, the invention first creates a calibration map to assess and record the above-described flow rate variations and then controls operation of the irrigation system in accordance with the calibration map to more accurately compensate for the flow rate variations.

To create a calibration map, actual flow rates through the irrigation system, or portions of the irrigation system, are periodically or continuously measured and recorded as the irrigation system moves across a field. These measured flow rates are then compared to expected flow rates through the irrigation system, or portions of the irrigation system, based on the original design or configuration of the irrigation system. Correction factors that account for the differences between the measured flow rates and the expected flow rates are then created for different portions or sections of the field. For example, if the measured flow rate in a first section is 5% less than expected, a correction factor of +5% is assigned to that section to indicate 5% more water is required. Similarly, if the measured flow rate in a second section is 10% more than expected, a correction factor of −10% is assigned to that section to indicate 10% less water is required. The correction factors and positional information for the corresponding field sections are then stored in the calibration map.

The calibration map may be created while the irrigation system is operating in a calibration mode or "on-the-fly" while the irrigation system is irrigating a field. The calibration map may be created when the irrigation system is first placed into service and may be periodically or continuously updated to account for changing conditions such as degradation of the valves, water emitters, pressure regulator and/or other components of the irrigation system.

Once the calibration map is created, a control system consults the calibration map to adjust at least one operational aspect of the irrigation system in accordance with the correction factors. For example, if an irrigation plan or an initial setting of the irrigation system calls for 10 gallons per minute (G.P.M.) of water in a section of the field, but the calibration map indicates a +10% correction factor for that section, the control system adjusts an operational aspect of the irrigation system so as to apply 10% more water than it would have without the calibration map. The operational aspect that is adjusted may be the speed of the irrigation system's mobile towers, a duty cycle of the irrigation system's water emitters, a water flow rate of individual water emitters or banks of water emitters, or anything else that controls the rate of fluid flow of the irrigation system to adjust water flow rates in accordance with the correction factors. For example, the control system may operate the mobile towers 10% slower than called for by an irrigation plan so as to apply 10% more water.

One particular embodiment of the invention is a method of calibrating an irrigation system having a plurality of mobile towers and a plurality of water emitters supported by the mobile towers. The method comprises: operating the mobile towers to move the irrigation system over a ground surface; toggling the water emitters as the irrigation system moves over the ground surface; determining positions of the irrigation system as the irrigation system moves over the ground surface and as the water emitters are toggled; measuring flow rates through the irrigation system as the irrigation system moves over the ground surface and as the water emitters are toggled; comparing the measured flow rates to expected flow rates; creating a calibration map that reflects differences between the measured flow rates and the expected flow rates at the determined positions; and calibrating operation of the irrigation system with the calibration map by adjusting an operational aspect of the irrigation system to account for the differences between the measured flow rates and the expected flow rates at the determined positions.

Another embodiment of the invention is an irrigation system comprising: a central pivot; a series of mobile towers each having wheels and a motor for driving the wheels; support structure for connecting the mobile towers to each other and to the central pivot; a water-carrying conduit supported by the support structure; a plurality of water emitters connected to the conduit for delivering water to a ground surface; a valve for controlling water flow to the water emitters; and a control system for controlling operation of the mobile tower motors and the valve so as to control the amount of water delivered to sections of a field. The control system is programmed to: operate the mobile towers to move the irrigation system over the field; toggle the valve as the irrigation system moves over the ground surface; determine positions of the irrigation system as the irrigation system moves over the ground surface and as the valve is toggled; measure fluid flow rates through the irrigation system as the irrigation system moves over the ground surface and as the valve is toggled; compare the measured flow rates to expected flow rates for the determined positions of the irrigation system; create a calibration map that reflects differences between the measured flow rates and the expected flow rates at the determined positions; and calibrate operation of the irrigation system with the calibration map by adjusting an operational aspect of the irrigation system to account for the differences between the measured flow rates and the expected flow rates at the determined positions.

In other embodiments of the invention, calibration maps similar to the ones described above may be created for other operating parameters of an irrigation system. For example, calibration maps may be created for operating parameters of one or more drive motors of an irrigation system. Such calibration maps may then be used to adjust operational aspects of the irrigation system, such as its ground speed, when measured operating parameters of a drive motor deviate from expected operating parameters. A method for this embodiment comprises: operating at least one drive motor of an irrigation system to move the irrigation system over a ground surface; determining positions of the irrigation system as the irrigation system moves over the ground surface; measuring amperage draw, wheel slippage, motor temperature, or another operating parameter of the drive motor as the irrigation system moves over the ground surface; comparing the measured operating parameter to expected operating parameters for the drive motor; creating a calibration map that reflects differences between the measured operating parameter and the expected operating parameters at the determined positions; and calibrating operation of the irrigation system with the calibration map by adjusting an operational aspect of the irrigation system to account for the differences between the measured operating parameter and the expected operating parameters at the determined positions. In one example, the calibration map of this embodiment may be used to slow the irrigation system when a measured temperature of the drive motor exceeds an expected temperature of the drive motor for a particular location in a field.

In another embodiment of the invention, calibration maps may be created for calibrating operation of an irrigation system to compensate for changes in operating parameters of one or more tires on the mobile towers of the irrigation system. A method for this embodiment may comprise: operating the mobile towers to move the irrigation system over a ground surface; determining positions of the irrigation system as the irrigation system moves over the ground surface; measuring tire pressure, tire temperature, or another operating parameter of at least one tire on the irrigation system as it moves over the ground surface; comparing the measured operating parameter to expected operating parameters for the tire; creating a calibration map that reflects differences between the measured operating parameter and the expected operating parameters at the determined positions; and calibrating operation of the irrigation system with the calibration map by adjusting an operational aspect of the irrigation system to account for the differences between the measured operating parameter and the expected operating parameters of the tire at the determined positions. In one example, the calibration map of this embodiment may be used to slow the irrigation system when a measured tire pressure falls below an expected tire pressure for a particular location in a field.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures. For example, the principles of the present invention are not limited to central pivot irrigation systems, but may be implemented in other types of irrigation systems including linear move irrigation systems.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
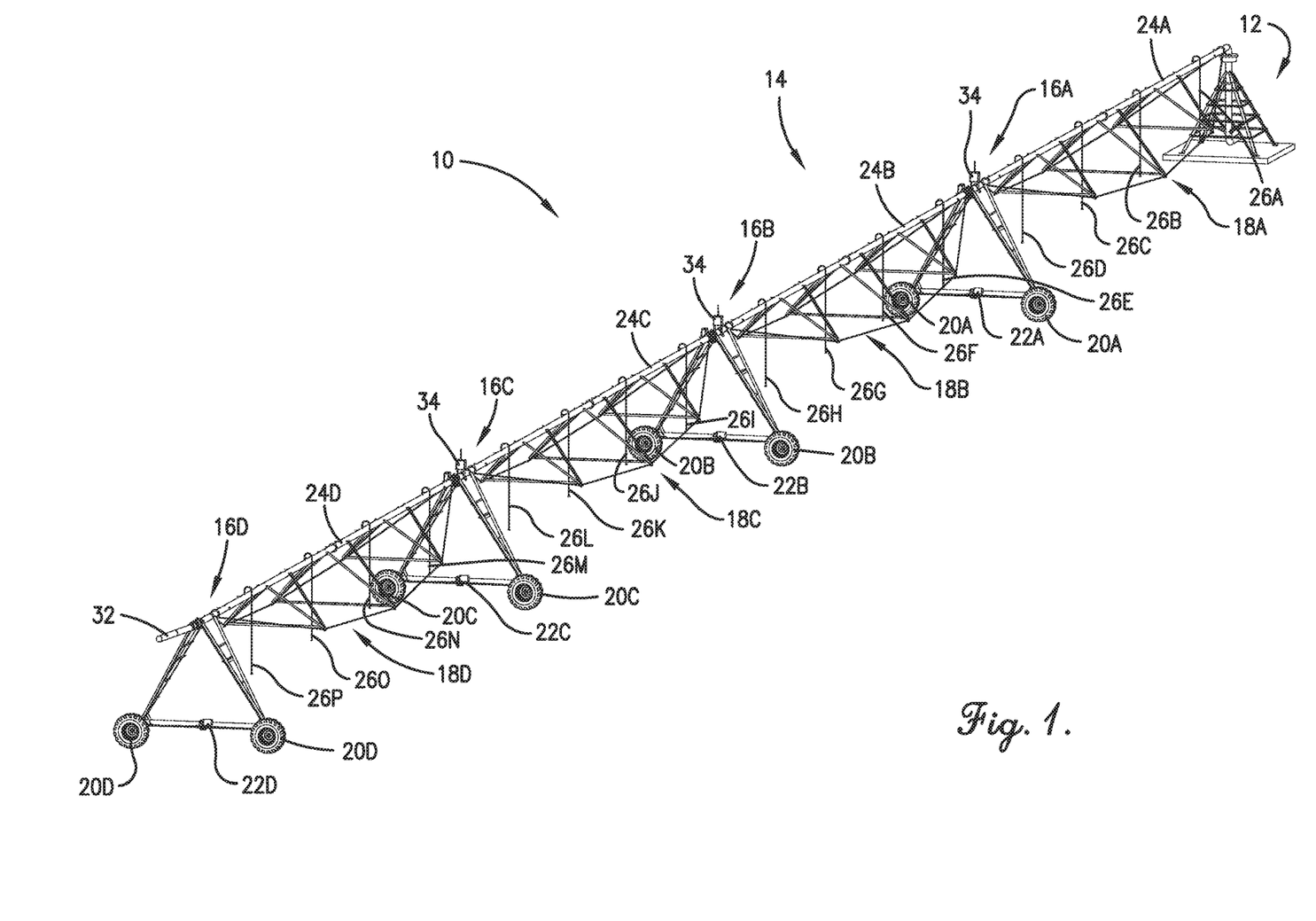
FIG. 1 is a perspective view of an exemplary central pivot irrigation system that may be used to implement aspects of the present invention.

Turning now to the drawing figures, and initially FIG. 1, an exemplary irrigation system 10 on which principles of the present invention may be implemented is illustrated. The illustrated irrigation system 10 is a central pivot irrigation system, but it may also be a linear move or lateral type irrigation system or any other type of automated irrigation system. The illustrated irrigation system 10 broadly comprises a fixed central pivot 12, a main section 14 pivotally connected to the central pivot, and a control system 100 (FIG. 2) for controlling operation of the irrigation system and for implementing the calibration features of the present invention.

The fixed central pivot 12 may be a tower or any other support structure about which the main section 14 pivots. The central pivot has access to a well, water tank, or other source of water and may also be coupled with a tank or other source of agricultural products to inject fertilizers, pesticides and/or other chemicals into the water for application during irrigation.

The main section 14 pivots or rotates about the central pivot 12 and includes a number of mobile support towers 16A-D, the outermost 16D of which is referred to herein as an end tower. The mobile towers are connected to the fixed central pivot 12 and to one another by truss sections 18A-D or other supports to form a number of interconnected spans. The illustrated irrigation system 10 has four mobile support towers, and thus four spans, however, it may comprise any number of towers and spans without departing from the scope of the invention The mobile towers have wheels 20A-D driven by drive motors 22A-D. Each motor 22A-D turns at least one of the wheels 22A-D through a drive shaft to move its mobile tower and thus the main section 14 in a circle or semi-circle about the central pivot 12. The motors 22A-D may include integral or external relays so they may be turned on, off, and reversed by the control system 100 as described below. The motors may also have several speeds or be equipped with variable speed drives.

Although not required, some or all of the towers 16A-D may be equipped with steerable wheels pivoted about upright axes by suitable steering motors so that the towers can follow a predetermined track. U.S. Pat. No. 4,508,269 in the name of Davis et al. is hereby incorporated by reference in its entirety into the present specification for a disclosure of ground drive motors and steering motors associated with an irrigation machine. As is also well known, the drive motors for the towers are controlled by a suitable safety system such that they may be slowed or completely shut down in the event of the detection of an adverse circumstance.

Each of the truss sections 18A-D carries or otherwise supports a conduit section 24A-D or other fluid distribution mechanism that is connected in fluid communication with all other conduit sections and to a source of fluids from the central pivot. A plurality of sprinkler heads, spray guns, drop nozzles, or other water emitters 26A-P are spaced along the conduit sections 24A-D to apply water and/or other fluids to land underneath the irrigation system.

At least one valve is disposed between the conduit sections 24A-D and the water emitters 26A-P to control the flow of water through the water emitters. In some embodiments, the irrigation system includes several valves, and each valve controls the flow of water through a single water emitter such that each water emitter can be individually opened, closed, pulsed, etc. to emit any amount of water. In an embodiment illustrated in FIG. 2, the irrigation system 10 includes several valves 28A-D that each control the flow of water through a group of water emitters such that the group of water emitters is controlled to emit a specific amount of water. For example, each span of the irrigation system may include four water emitters, and one valve may control the water flow through all four water emitters such that all of the water emitters on a span operate in unison. The valves may be magnetic latching solenoid valves that are normally biased to an off/closed state such that the valves only switch to an on/open state when powered, but they may be any type of valve.

In accordance with one aspect of the invention, the irrigation system 10 also includes at least one flow meter 30 (FIG. 2) that measures water flow rates through the system. Outputs from the flow meter are provided to the control system 100 to calibrate the irrigation system as described in more detail below. In one embodiment, a single flow meter measures flow rates through the entire irrigation system and provides an indication of this aggregate flow rate to the control system. In other embodiments, multiple flow meters provide flow-rate measurements through different portions of the irrigation system, such as through each span of the irrigation system or even each water emitter. However, because equipping an irrigation system with multiple flow meters is costly and complicated, embodiments of the present invention permit calibration of the irrigation system with a single flow meter as discussed below.

Embodiments of the irrigation system may also include a pressure regulator for regulating the pressure of water through to the irrigation system. Pumps that provide water to the irrigation system may be configured to provide a minimum water pressure, and the pressure regulator then reduces the pump water pressure to a selected maximum pressure level such that the pumps and pressure regulator together provide a relatively constant water pressure through the irrigation system. However, as described above and below, the water pressure of the irrigation system may still fluctuate as the irrigation system moves about a field and/or over time as the pressure regulator ages.

The irrigation system 10 may also comprise other components such as an extension arm (also commonly referred to as a "swing arm" or "corner arm") pivotally connected to the free end of the main section and/or one or more high pressure sprayers or end guns 32 mounted to the end tower 16D or to the end of the extension arm. The end guns are activated at the corners of a field or other designated areas to increase the amount of land that can be irrigated.

Figure 2:
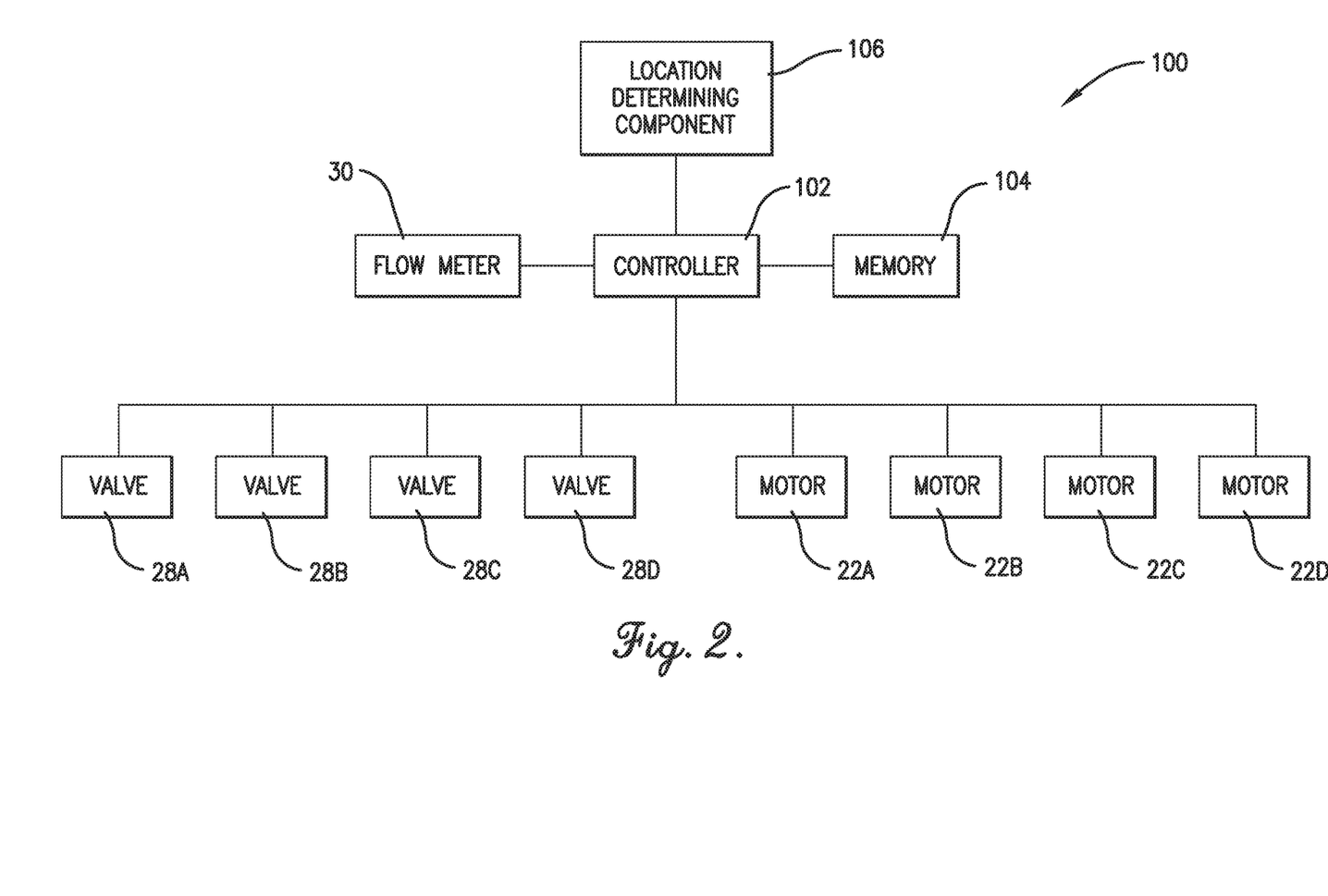
FIG. 2 is a block diagram that depicts selected components of a control system of the irrigation system.

The control system 100 and its operation will now be described in more detail. The control system 100 controls operation of the irrigation system and implements some of the calibration steps as described in more detail below. The control system and can be implemented with hardware, software, firmware, or a combination thereof. One embodiment of the control system 100 is illustrated in FIG. 2 and comprises a controller or other computing device 102, memory 104, and a location-determining component 106. The control system 100 may also include conventional input devices such as knobs, buttons, switches, dials, etc.; inputs for receiving programs and data from external devices; one or more displays; a cellular or other radio transceiver for wirelessly receiving and transmitting data from and to remote devices; a Bluetooth transceiver; a WiFi transceiver; and/or other electronic components.

The computing device 102 may comprise or include any number or combination of processors, controllers, ASICs, computers or other control circuitry. As illustrated, the computing device includes data inputs for receiving data from the flow-meter 30 and the location-determining component 106 and outputs connected to the relay-controlled valves 28A-B and the relay-controlled drive motors 22A-D. The illustrated control system 100 is shown controlling four drive motors 22A-D and four valves 28A-D, but it may control any number of motors and valves and other components of the irrigation system.

Some of the control functions described herein may be implemented with one or more computer programs executed by the computing device 100. Each computer program comprises an ordered listing of executable instructions for implementing logical functions in the computing device 102 and can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device including, but not limited to, the memory 104. The computer-readable medium can be, for example, but not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a random access memory (RAM), a read-only memory (ROM), an erasable, programmable, read-only memory (EPROM or Flash memory), an optical fiber, and a portable compact disk read-only memory (CDROM).

The memory 104 may be any electronic memory that can be accessed by the computing device 102 and operable for storing instructions or data. The memory 104 may be integral with the computing device 102 or may be external memory accessible by the computing device. The memory may be a single component or may be a combination of components that provide the requisite functionality. The memory may include various types of volatile or non-volatile memory such as flash memory, optical discs, magnetic storage devices, SRAM, DRAM, or other memory devices capable of storing data and instructions. The memory may communicate directly with the computing device or may communicate over a bus or other mechanism that facilitates direct or indirect communication. The memory may optionally be structured with a file system to provide organized access to data existing thereon.

The location-determining component 106 may be any device capable of determining positions of the irrigation system. The location-determining component may comprise, for example, an angle encoder positioned at the central pivot and the joint of each span of the irrigation system for sensing an angle between the central pivot 12 and the main section 14 and between each span of the irrigation system. In some embodiments, the angle encoders may be incorporated in existing articulating joints positioned between the spans so that the control system does not require its own dedicated angle encoders. The location-determining component 106 may also comprise one or more modified cam switches, proximity switches, optical encoders, potentiometers, light bar sensors, etc. at each span joint.

The location-determining component 106 may also be a global navigation satellite system (GNSS) receiver such as a GPS receiver, Glonass receiver, Galileo receiver, or compass system receiver attached to or near one or more of the mobile towers and operable to receive navigational signals from satellites to calculate positions of the mobile towers as a function of the signals. Each GNSS receiver may include one or more processors, controllers, or other computing devices and memory for storing information accessed and/or generated by the processors or other computing devices. In some embodiments, a single GNSS receiver receives satellite signals from separate antennas mounted to each mobile tower so that a receiver is not required at each tower. The GNSS receiver or receivers may be incorporated in the main control system so that the control system does not require its own dedicated GNSS receivers or may be stand-alone devices. Each GNSS receiver may be coupled with a patch antenna, helical antenna, or any other type of antenna.

The location-determining component 106 may also comprise other type of receiving devices capable of receiving location information from at least three transmitting locations and performing basic triangulation calculations to determine the relative position of the receiving device with respect to the transmitting locations. For example, cellular towers or any customized transmitting radio frequency towers can be used instead of satellites. With such a configuration, any standard geometric triangulation algorithm can be used to determine the exact location of the receiving unit.

Some or all of the components of the control system 100 may be enclosed in or supported on a weatherproof housing for protection from moisture, vibration, and impact. The housing may be positioned anywhere on or near the irrigation system and may be constructed from a suitable vibration- and impact-resistant material such as, for example, plastic, nylon, aluminum, or any combination thereof and may include one or more appropriate gaskets or seals to make it substantially waterproof or resistant.

The above-described components of the control system 100 need not be physically connected to one another since wireless communication among the various depicted components is permissible and intended to fall within the scope of the present invention. Thus, portions of the control system 100 may be located remotely from the irrigation system and from each other.

Certain operational aspects of the control system 100 will now be described. The control system 100 controls operational aspects of the irrigation system such as the speed and direction of the mobile towers, and hence the speed of the irrigation system, via control signals provided to the relays connected to the motors 22A-D of the mobile towers 11A-D. Likewise, the control system 100 controls the water flow through the water emitters 26A-P via control signals provided to the relays connected to the valves 28A-D. The control system may also control other operational aspects such as a fertilizer application rate, a pesticide application rate, end gun operation, mobile tower direction (forward or reverse), and/or system start-up and/or shut-down procedures.

The control system 100 may control some of the above-described operational aspects of the irrigation system in accordance with an irrigation plan (also sometimes referred to as a "sprinkler chart" or "watering plan"). An irrigation plan specifies how much water to apply to a field, and sometimes to different portions of a field, based on various different criteria such as the types of crops to be irrigated; the soil conditions in various parts of the field; the existence of slopes, valleys, etc. in the field; the existence of roads, buildings, ponds, and boundaries that require no irrigations; crop growth cycles; etc. One or more irrigation plans may be created then stored in the memory 104 or otherwise be accessible by the computing device 102.

An exemplary irrigation plan will now be described with reference to FIG. 3, which shows a circular field 300 or portion of a field divided into a number of wedge-shaped sections 302-316. The field is shown divided into 8 equal-sized sections, but it may be divided into any number of sections of any size. The figure also depicts a four-span irrigation system 10 operating in the field. Each of the wedge-shaped sections may require different amounts of irrigation for the reasons discussed above.

Figure 3:
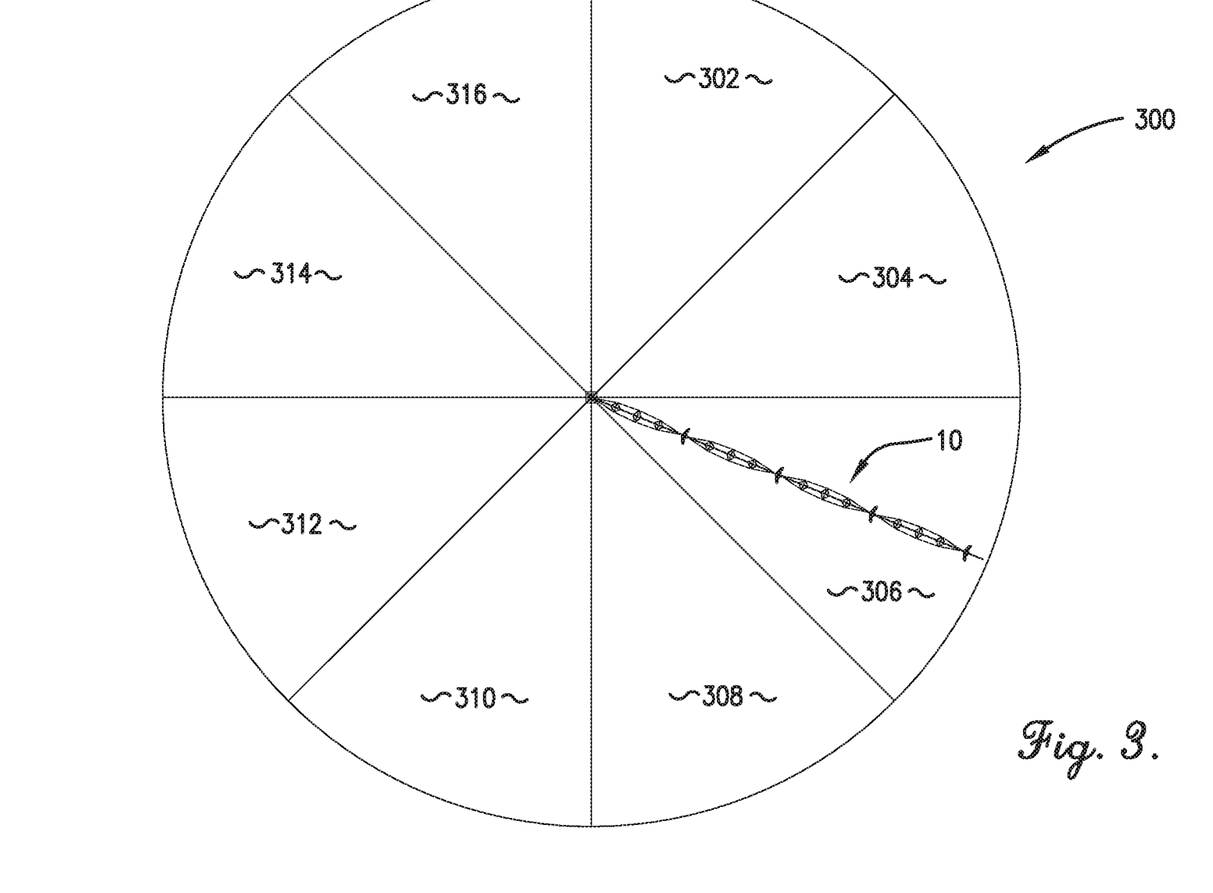
FIG. 3 is a schematic plan view of a field that has been subdivided into a number of wedge-shaped sections and showing the irrigation system operating in the field.

An irrigation plan that corresponds to the field shown in FIG. 3 indicates how much water is desired in each of the wedge-shaped sections 302-316. For example, the irrigation plan may call for 10 G.P.M. in section 302, 20 G.P.M. in section 304, 0 G.P.M. in section 306, etc. This particular irrigation plan is likely for an irrigation system in which all the water emitters are turned on or off together (only one valve for the entire irrigation system) because each wedge-shaped section is not further sub-divided into smaller sections served by just some of the water emitters.

Another exemplary irrigation plan will now be described with reference to FIG. 4, which shows a circular field 400 or portion of a field divided into a number of wedge-shaped sections 402-416, with each wedge-shaped section further sub-divided into a number of annulus sectors identified by the letters A-D. The field is shown divided into 8 equal-sized wedge-shaped sections, and each wedge is subdivided into 4 annulus sectors, each corresponding to one span of the irrigation system in a particular position in the field. However, the field may be divided into any number of sections and sectors of any size. At least some of the sections and/or annulus sectors may require different amounts of irrigation for the reasons discussed above.

Figure 4:
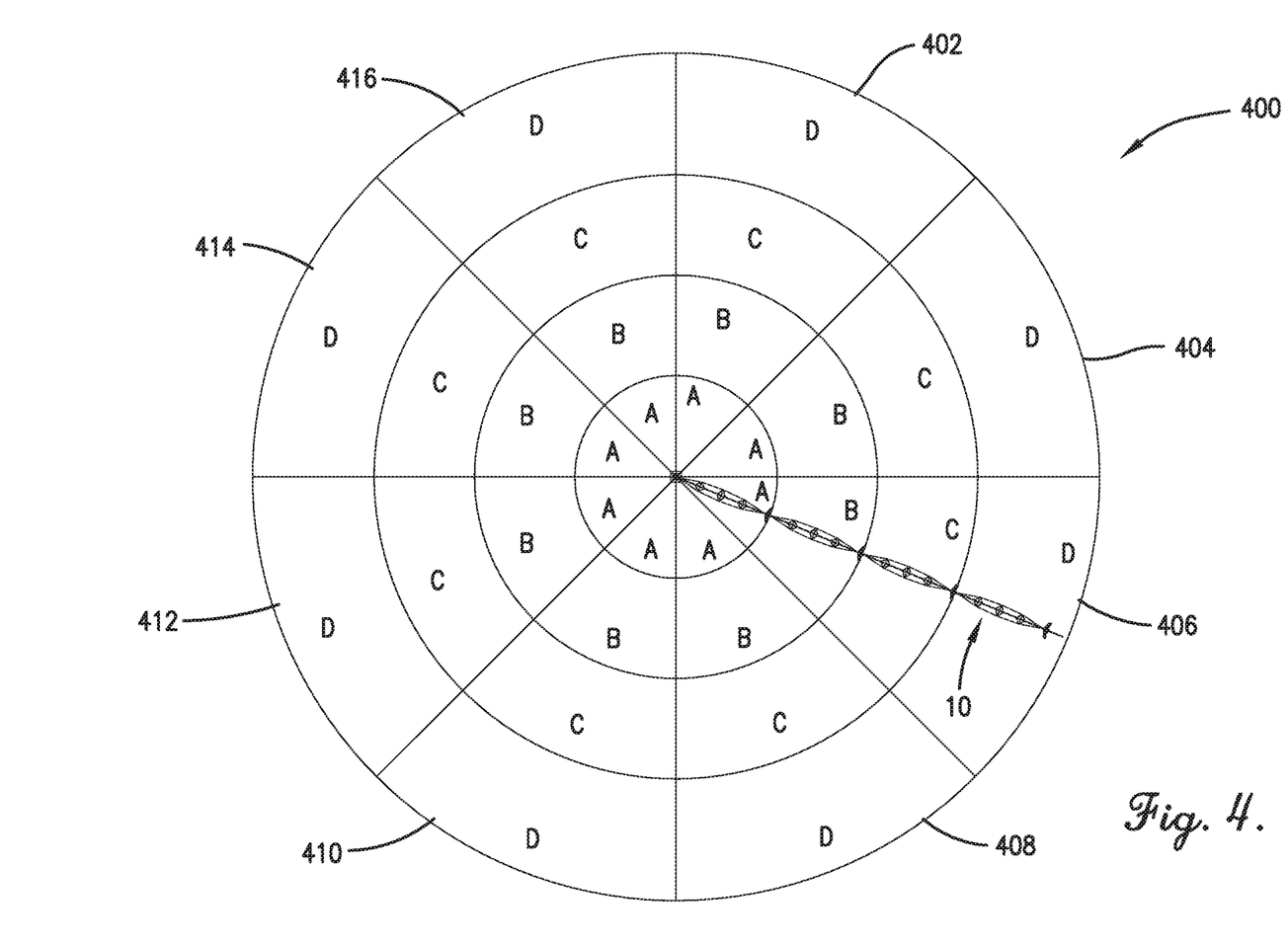
FIG. 4 is a schematic plan view of a field that has been subdivided into a number of wedge-shaped sections with each section further divided into a number of annulus sectors and showing the irrigation system operating in the field.

An irrigation plan that corresponds to the field shown in FIG. 4 indicates how much water is desired in each of the annulus sectors. This irrigation plan is likely for an irrigation system that has a separate valve for each span of the irrigation system such that the water emitters on each span may be controlled separately from the water emitters on other spans. For example, annulus sector 402B may receive a different amount of water than annulus sector 402D even through both sectors are within the same wedge-shaped section 402.

The irrigation plans described above and/or other irrigation plans may be stored in the memory 104 or may otherwise be accessible by the computing device 102. Each irrigation plan includes data that represents the geographical boundaries of each of its sections and sectors and data that represents the desired fluid amount or flow rate in the sections and sectors. For example, an irrigation plan may include data that represents the boundaries or position of annulus section 402D and a desired water flow rate of 15 GPM in this sector. When the irrigation system is operating, the control system 100 adjusts the speed of the mobile towers, the positions of the valves, and/or other operational aspects of the irrigation system to achieve the amount of irrigation prescribed by one of the irrigation plans in the sections and sectors.

Those skilled in the art will appreciate that these are merely examples of irrigation plans and that a nearly endless number of irrigation plans may be created for the irrigation system 10. A more detailed explanation of irrigation plans is provided in U.S. Pat. No. 8,739,830, which is incorporated by reference into the present applicant in its entirety.

Even when controlled by an irrigation plan, the irrigation system 10 may fail to deliver the prescribed amounts of water for the reasons discussed above. The present invention solves this problem by providing a system and method for calibrating the irrigation system 10 to account for variations in flow rates caused by field elevation changes, pipe friction losses, water emitter nozzle wear, pressure-regulator inaccuracies, and other factors. In general, the invention first creates a calibration map to assess and record the above-described flow rate variations and then controls operation of the irrigation system 10 in accordance with the calibration map.

To create a calibration map, actual flow rates through the irrigation system 10, or portions of the irrigation system, are periodically or continuously measured and recorded as the irrigation system 10 moves across a field. These measured flow rates are then compared to expected flow rates through the irrigation system, or portions of the irrigation system, based on the original design or configuration of the irrigation system. Correction factors that account for the differences between the measured flow rates and the expected flow rates are then created for different portions or sections of the field. For example, if the measured flow rate in a first section is 5% less than expected, a correction factor of +5% is assigned to that section to indicate 5% more water is required in that section. Similarly, if the measured flow rate in a second section is 10% more than expected, a correction factor of −10% is assigned to that section to indicate 10% less water is required in that section. The correction factors and geographic coordinates or other positional information for the corresponding field sections are then stored in the calibration map.

The calibration map may be created while the irrigation system is operating in a calibration mode or "on-the-fly"

while the irrigation system is irrigating a field. The calibration map may be created when the irrigation system is first placed into service and may be periodically or continuously updated to account for changing conditions such as degradation of the valves, water emitters, pressure regulator and/or other components of the irrigation system.

Creation of exemplary calibration maps will now be described in more detail with reference to the exemplary irrigation plans described above. Although each calibration map may correspond to a particular irrigation plan, the calibration maps are not necessarily linked to particular irrigation plans and may be used to calibrate any number of irrigation plans or even an irrigation system that is not operating under the direction of an irrigation plan.

Figure 5:
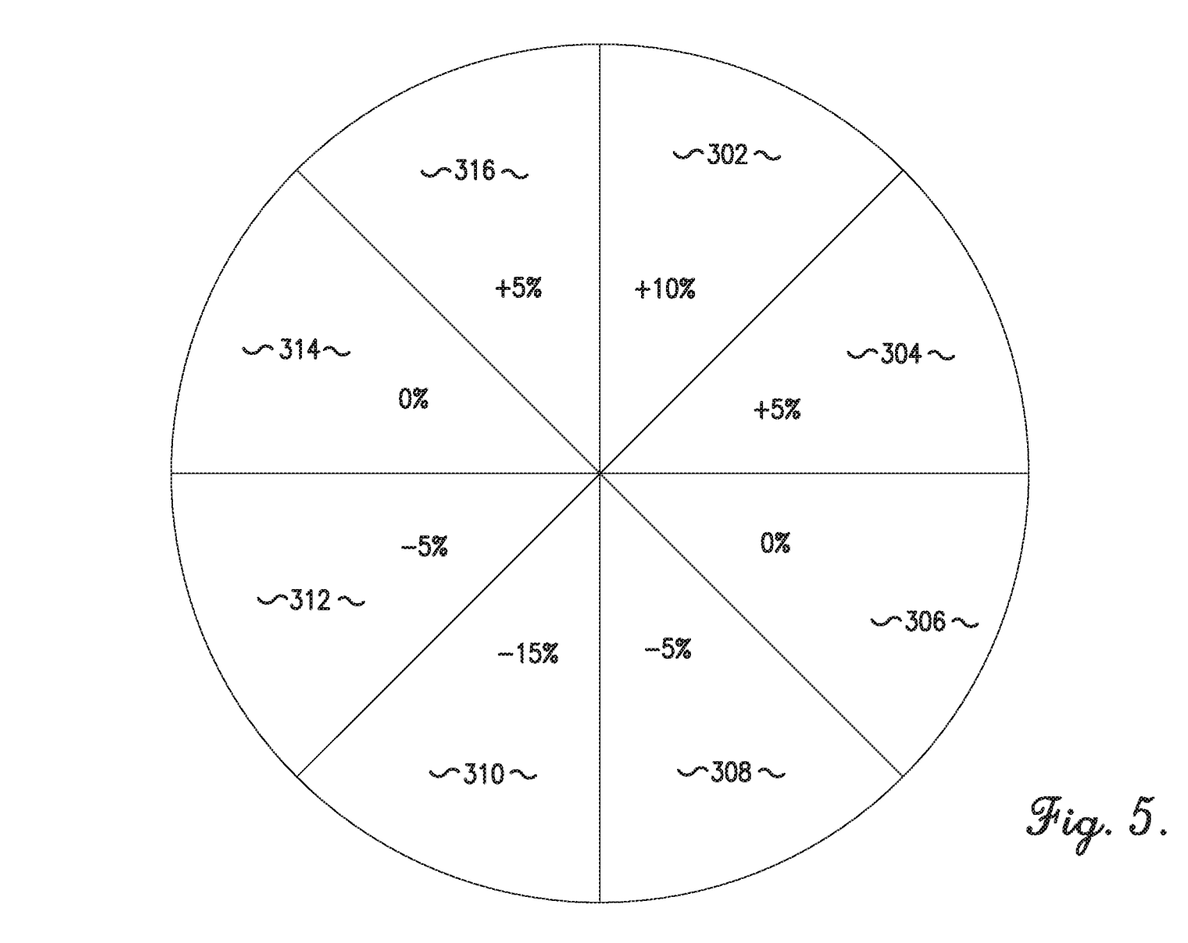
FIG. 5 is a graphical representation of a calibration map that may be used to calibrate operation of the irrigation system.

A first exemplary calibration map is graphically represented in FIG. 5 and may correspond to the field represented in FIG. 3 and the irrigation plan created for this field. As depicted, the calibration map has correction factors for each pie-shaped section 302-316 of the irrigation plan. The correction factors are shown as percentages but may be in other forms such as fractions, decimals, or other data. This calibration map corresponds to an irrigation system that does not control individual water emitters or banks of water emitters but instead controls all of the water emitters with a single valve.

The calibration map represented in FIG. 5 is created by measuring and recording actual flow rates through the irrigation system, or portions of the irrigation system, while it operates in each of the sections 302-316. These measured flow rates are then compared to expected flow rates through the irrigation system, or portions of the irrigation system, for the same sections. Differences between the measured flow rates and the expected flow rates for the sections are then calculated to create correction factors for each section of the field. For example, section 302 shows a correction factor of +10%, which indicates the measured flow rates for section 302 are 10% below the expected flow rates and therefore 10% more water is required for that section. Similarly, section 310 shows a correction factor of −15%, which indicates the measured flow rates for that section are 15% above the expected flow rates and therefore 15% less water is required for that section.

FIG. 5 is just a graphical representation of the first calibration map. In actual implementation, the calibration map is likely stored as a table, database, or other data structure, with data corresponding to the geographical coordinates of the sections 302-316 and the correction factors for each section.

Figure 6:
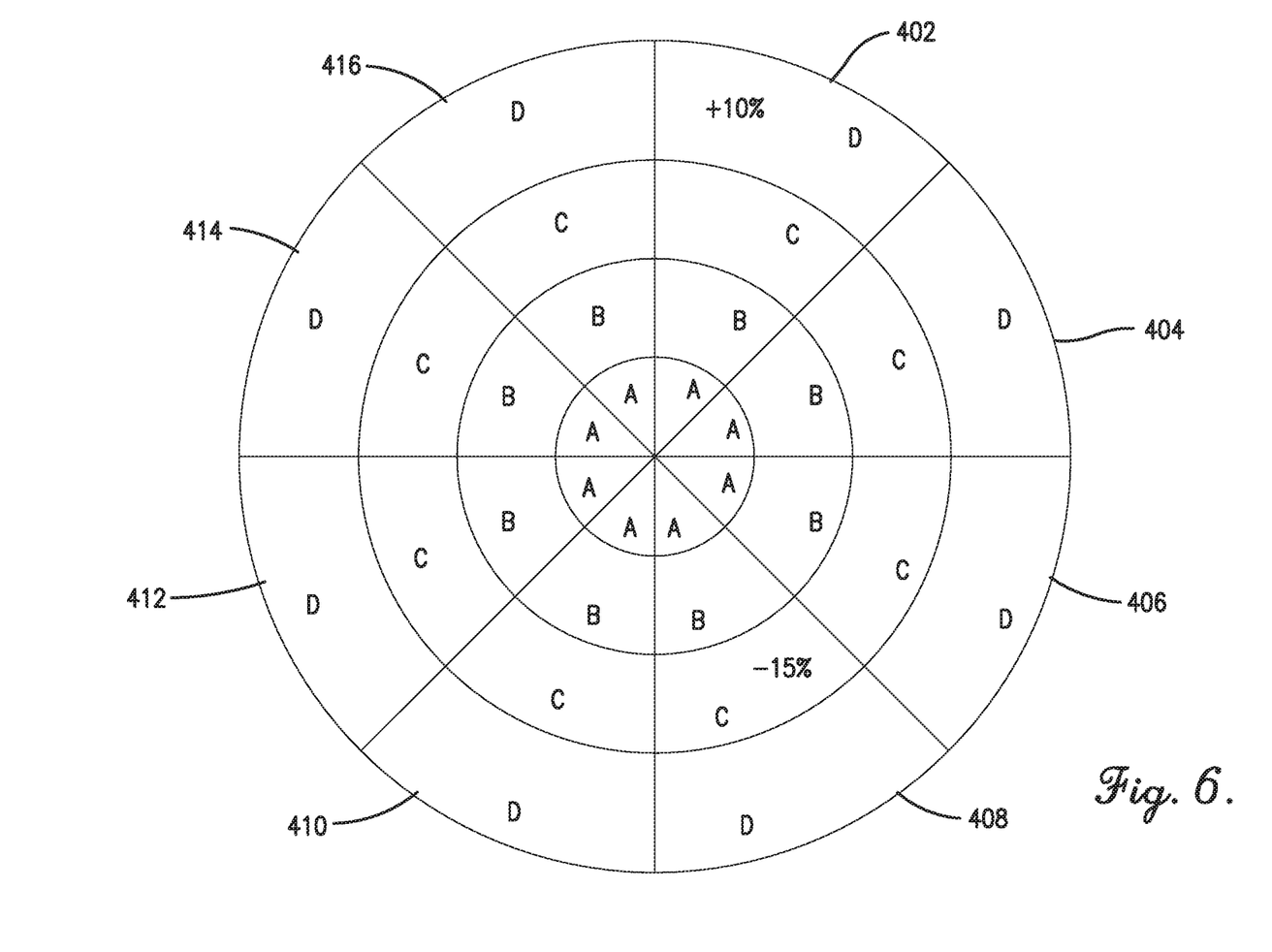
FIG. 6 is a graphical representation of another calibration map that may be used to calibrate operation of the irrigation system.

A second exemplary calibration map is graphically represented in FIG. 6 and may correspond to the field represented in FIG. 4 and the irrigation plan created for this field. The calibration map has correction factors for at least some of the annulus sectors, and preferably all the sectors, but the figure only includes a few representative correction factors. This calibration map likely corresponds to an irrigation system that has a separate valve for each span of the irrigation system such that the water emitters on each span may be controlled separately from the water emitters on other spans.

The second calibration map is created in a similar manner as the first calibration map but requires extra steps to account for the annulus sectors. This calibration map is created by measuring and recording actual flow rates through each span of the irrigation system while it operates. During a calibration pass, the control system toggles or otherwise controls individual water emitters, or banks of water emitters, on and off by operating the valves 28A-D. The control system determines how much water is actually being emitted from individual water emitters, or banks of water emitters, by comparing changes in the overall flow rate through the irrigation system as the water emitters are toggled. For example, the control system may close the water emitters on the outermost span of the irrigation system, but leave all other water emitters fully open, and then note how much the total water flow through the irrigation system dropped. Because the pressure regulator maintains a relatively constant water pressure in the irrigation system even as valves are opened and closed, the water flow reduction approximates the amount of water flow through the water emitters on the outermost span of the irrigation system when they are fully open. These steps may be repeated for every group of water emitters, and even for individual water emitters, for each annulus sector of the field.

These measured flow rates are then compared to expected flow rates through the spans for the sectors. Differences between the measured flow rates and the expected flow rates for the sectors are then determined to create correction factors for each annulus sector of the field. For example, sector 402D shows a correction factor of +10%, which indicates the measured flow rates for that sector are 10% below the expected flow rates for that sector and therefore 10% more water is required for that sector. Similarly, sector 408C shows a correction factor of −15%, which indicates the actual flow rates for that sector are 15% above the expected flow rates and therefore 15% less water is required for that sector.

Once a calibration map is created, the control system 100 consults the calibration map during operation of the irrigation system to adjust at least one operational aspect of the irrigation system in accordance with the correction factors. For example, if an irrigation plan or an initial setting of the irrigation system calls for 10 gallons per minute (G.P.M.) of water in a section or sector of the field, but the calibration map indicates a +10% correction factor for the section or sector, the control system adjusts an operational aspect of the irrigation system so as to apply 10% more water than it would have without the calibration map. The operational aspect that is adjusted may be the speed of the irrigation system's mobile towers, a duty cycle of the irrigation system's water emitters, a water flow rate of individual water emitters or banks of water emitters, or anything else that controls the rate of fluid flow of the irrigation system to adjust water flow rates in accordance with the correction factors. For example, the control system may operate the mobile towers 10% slower than called for by the irrigation plan or the initial setting of the irrigation system so as to apply 10% more water.

The above-described calibration maps can also be used to detect faults in an irrigation system such as leaks, valves stuck open, end guns stuck open, abnormally high system water pressures, blocked water emitter nozzles, valves stuck closed, end guns stuck closed, and abnormally low system water pressures. For example, if a calibration map indicates measured water flow rates are much higher than expected for multiple sections or sectors of a field, this may indicate a leak, valve stuck open, or end gun stuck open. By successively toggling different valves or banks of valves, the control system can isolate which water emitters or banks of water emitters that are stuck open or closed.

When a calibration map is updated, the control system may compare the most current version of the calibration map to one or more previous versions of the calibration map to detect changes in the correction factors. These changes, if gradual, may indicate normal and expected water flow variations, but if significant, may indicate problems such as stuck valves, leaks, and/or other defects.

Figure 7:
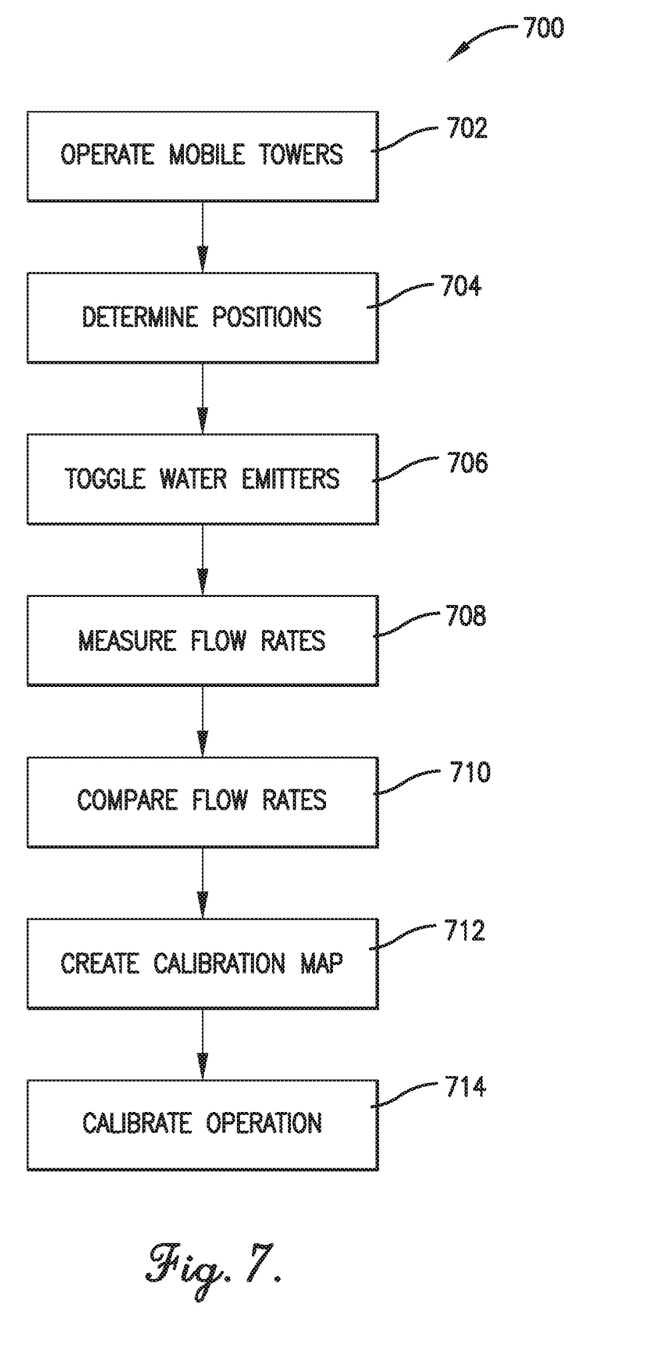
FIG. 7 is a flow diagram depicting exemplary steps in a method of the present invention or portions of a computer program of an embodiment of the present invention.

The flow chart of FIG. 7 shows the functionality and operation of an exemplary method 700 of the present technology. Some of the blocks of the flow chart may represent a step in the method 700 and/or a module section or portion of code of computer programs the operate the control system 100. In some alternative implementations, the functions noted in the various blocks may occur out of the order depicted in FIG. 7. For example, two blocks shown in succession in FIG. 7 may in fact be executed substantially concurrently, or the block may sometimes be executed in the reverse order depending upon the functionality involved.

The method 700 begins in step 702 where the control system operates the mobile towers to move the irrigation system over a ground surface. The control system may operate the mobile towers and water emitters in accordance with an irrigation plan or initial settings of the irrigation system.

In step 704, the control system receives position or orientation information for the mobile towers 16A-D. The position or orientation information may be obtained from the location-determining component 106 or a similar device. This step, and all other steps of the method, may be performed in a different order. For example, the position of the irrigation system may be determined after and/or during steps 706 and 708.

In step 706, the control system 100 toggles the water emitters as the irrigation system moves over the ground surface. In step 708, the control system 100 measures flow rates through the irrigation system as the irrigation system moves over the ground surface and as the water emitters are toggled. Steps 706 and 708 allow the control system to determine actual flow rates through specific water emitters or banks of water emitters as described above. The toggling step is not required for an irrigation system with a single valve that controls water delivery to all the water emitters.

In step 710, the control system 100 compares the measured flow rates to expected flow rates. This step and other steps may be repeated for every section and sector of the field as described above.

In step 712, the control system 100 creates a calibration map that reflects differences between the measured flow rates and the expected flow rates in the sections and sectors. As discussed above, the calibration map includes correction factors for different sections and/or sectors. These correction factors account for the differences between the measured flow rates and the expected flow rates in the sections or sectors and are used to adjust operational aspects of the irrigation system.

In step 714, the control system 100 calibrates operation of the irrigation system 10 with the calibration map by adjusting at least one operational aspect of the irrigation system to account for the differences between the measured flow rates and the expected flow rates. The operational aspects of the irrigation system that can be adjusted may be a speed of the mobile towers, a duty cycle of the water emitters, a water flow rate of the water emitters, or anything else that controls the rate of fluid flow of the irrigation system.

Some of the above-described steps may be performed by the control system 100 and/or an external computing device not located on the irrigation system. The external computing device may communicate with the control system 100 or directly with the drive motors 22A-D and/or the valves 28A-D via wireless communication channels.

Figure 8:
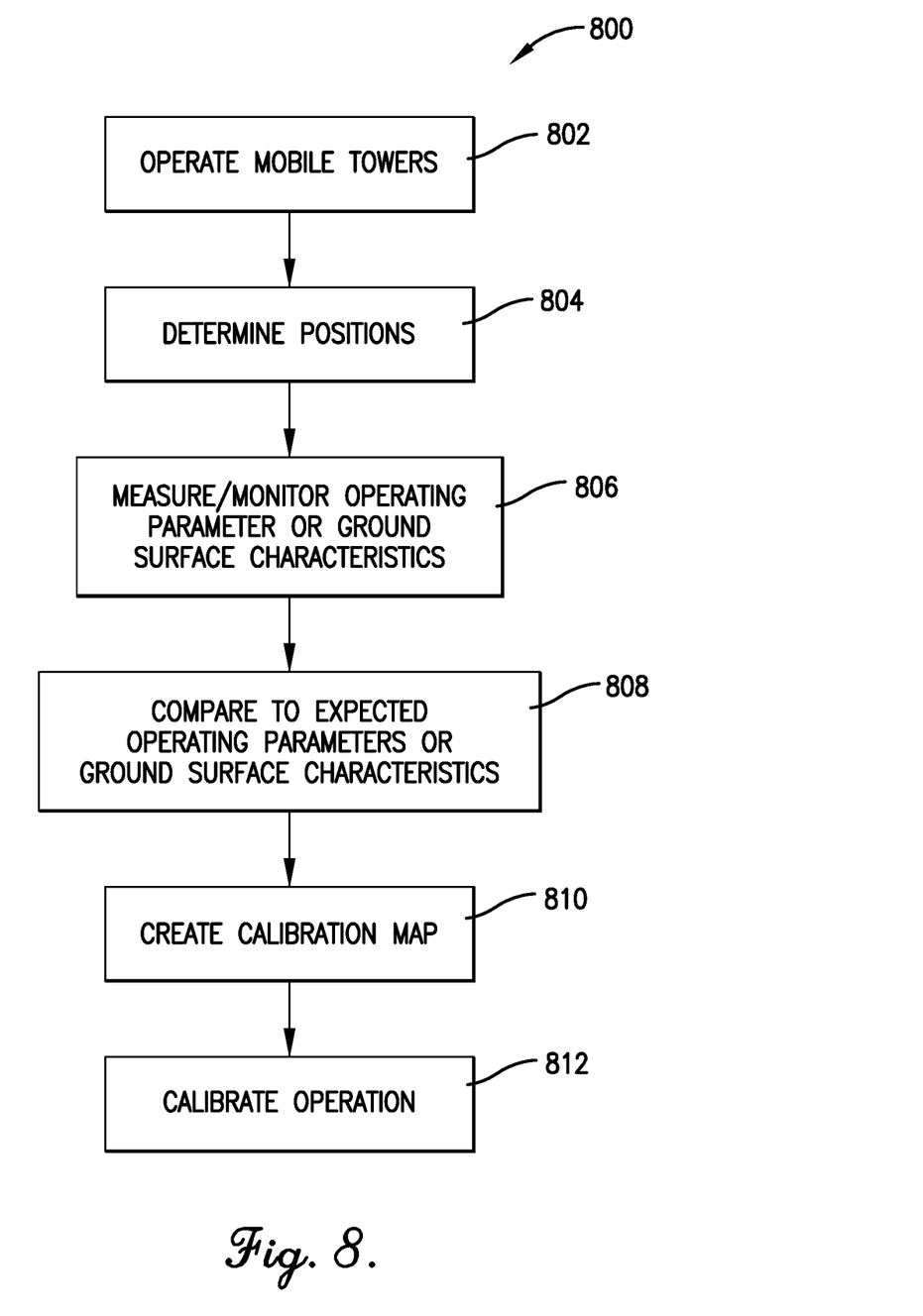
FIG. 8 is a flow diagram depicting exemplary steps in another method of the present invention or portions of a computer program of another embodiment of the present invention.

In other embodiments of the invention, calibration maps similar to the ones described above may be created for operating parameters of one or more drive motors of an irrigation system. The flow chart of FIG. 8 shows the functionality and operation of an exemplary method 800 of such an embodiment. The method 800 may comprise: operating the mobile towers to move the irrigation system over a ground surface by activating at least one drive motor of the irrigation system as depicted in step 802; determining positions of the irrigation system as the irrigation system moves over the ground surface as depicted in step 804; measuring amperage draw, wheel slippage, motor temperature, or another operating parameter of the drive motor as the irrigation system moves over the ground surface as depicted in step 806; comparing the measured operating parameter of the motor to expected operating parameters as depicted in step 808; creating a calibration map that reflects differences between the measured operating parameter and the expected operating parameters at the determined positions as depicted in step 810; and calibrating operation of the irrigation system with the calibration map by adjusting an operational aspect of the irrigation system to account for the differences between the measured operating parameter and the expected operating parameters at the determined positions as depicted in step 812. In one example, the calibration map may be used to slow the irrigation system when a measured temperature of the drive motor exceeds an expected temperature of the drive motor for a particular location in a field. In another example, the calibration map may be used to stop, slow, or reverse the irrigation system when a measured wheel slippage exceeds an expected wheel slippage for a particular location in a field. The amperage draw of the drive motor may be measured with an amperage sensor, the wheel slippage may be monitored with a wheel slippage sensor, and the motor temperature may be sensed with a motor temperature sensor. This method may further comprise generating and sending an alert if the measured operating parameter deviates from the expected operating parameters by more than a threshold amount. In some embodiments, the threshold amount is between 5-20%.

In other embodiments of the invention, calibration maps similar to the ones described above may be created for operating parameters of one or more tires of an irrigation system. Such a method may comprise: operating the mobile towers to move the irrigation system over a ground surface by activating at least one drive motor of the irrigation system; determining positions of the irrigation system as the irrigation system moves over the ground surface; measuring tire pressure, tire temperature, or another operating parameter of at least one tire attached to the drive motor as the irrigation system moves over the ground surface; comparing the measured operating parameter of the tire to expected operating parameters for the tire; creating a calibration map that reflects differences between the measured operating parameter and the expected operating parameters at the determined positions; and calibrating operation of the irrigation system with the calibration map by adjusting an operational aspect of the irrigation system to account for the differences between the measured operating parameter and the expected operating parameters of the tire at the determined positions. In one example, the calibration map may be used to slow the irrigation system when a measured tire pressure falls below an expected tire pressure for a particular location in a field. This method may also further comprise generating and sending an alert if the measured operating parameter deviates from the expected operating parameters by more than a threshold amount. In some embodiments, the threshold amount is between 5-20%.

In still other embodiments of the invention, calibration maps similar to the ones described above may be created for characteristics of a field irrigated by the above-described irrigation system. For example, the irrigation system may be equipped with a camera, water sensor, or other device that is able to detect standing water or "ponding" on an irrigated field. In this embodiment, a method may comprise: operating the mobile towers to move the irrigation system over a ground surface; determining positions of the irrigation system as the irrigation system moves over the ground surface; measuring or otherwise detecting standing water or ponding on the field in all sections of the field; comparing the measured standing water to expected standing water for each section of the field; creating a calibration map that reflects differences between the measured standing water and the expected standing water at the determined positions; and calibrating operation of the irrigation system with the calibration map by adjusting an operational aspect of the irrigation system to account for the differences between the measured standing water and the expected standing water. For example, if excess standing water is measured for a section of the field, the irrigation system may be slowed, stopped, and/or reversed or the water discharge from the irrigation system reduced in that section. This embodiment of the method may further comprise generating and sending an alert if the measured standing water deviates from the expected standing water by more than a threshold amount. In some embodiments, the threshold amount is between 5-20%.

Although the invention has been described with reference to the embodiments illustrated in the attached drawing figures, it is noted that equivalents may be employed and substitutions made herein without departing from the scope of the invention as recited in the claims. For example, the principles of the present invention are not limited to the illustrated central pivot irrigation systems but may be implemented in any type of irrigation system including linear move irrigation systems.

Having thus described the preferred embodiment of the invention, what is claimed as new and desired to be protected by Letters Patent includes the following:

1. A method of calibrating an irrigation system having a plurality of mobile towers driven by a drive motor and a plurality of water emitters supported by the mobile towers, the method comprising:
   operating the mobile towers in accordance with an irrigation plan to move the irrigation system over a plurality of sections of a ground surface;
   determining positions of the irrigation system as it moves;
   measuring operating parameters of the drive motor as the irrigation system traverses each of the sections;
   comparing the measured operating parameters to expected operating parameters for the drive motor for each of the sections;
   creating a calibration map that reflects differences between the measured operating parameters and the expected operating parameters for each of the sections, the calibration map including a separate correction factor for each of the sections, wherein each of the correction factors accounts for differences between the measured operating parameters and the expected operating parameters for its respective section and not any of the other sections; and
   calibrating operation of the irrigation system with the calibration map by adjusting an operational aspect of the irrigation system for each of the sections in accordance with the separate correction factors for the sections to account for the differences between the measured operating parameters and the expected operating parameters for each of the sections so that each of the sections is calibrated independently.

2. The method as set forth in claim 1, wherein the operational aspect of the irrigation system is selected from the group consisting of a speed of the mobile towers, a duty cycle of the water emitters, and a water flow rate of the water emitters.

3. The method as set forth in claim 1, wherein the method is performed during a calibration run of the irrigation system or while the irrigation system is irrigating the ground surface.

4. The method as set forth in claim 1, wherein the operating parameters of the drive motor are an amperage draw of the drive motor, a wheel slippage of a wheel coupled to the drive motor, or a temperature of the drive motor.

5. The method as set forth in claim 1, wherein the measuring step is performed with an amperage sensor, a wheel slippage sensor, or a motor temperature sensor.

6. The method as set forth in claim 1, further comprising generating and sending an alert if the measured operating parameters deviate from the expected operating parameters by more than a threshold amount.

7. A method of calibrating an irrigation system having a plurality of mobile towers, the method comprising:
   operating the mobile towers in accordance with an irrigation plan to move the irrigation system over a plurality of sections of a ground surface;
   determining positions of the irrigation system as it moves;
   monitoring characteristics of the ground surface as the irrigation system traverses each of the sections;
   comparing the monitored characteristics to expected characteristics of the ground surface for each of the sections;
   creating a calibration map that reflects differences between the monitored characteristics and the expected characteristics for each of the sections, the calibration map including a separate correction factor for each of the sections, wherein each of the correction factors accounts for differences between the monitored characteristics and the expected characteristics for its respective section and not any of the other sections; and
   calibrating operation of the irrigation system with the calibration map by adjusting an operational aspect of the irrigation system for each of the sections in accordance with the separate correction factors for the sections to account for the differences between the monitored characteristics and the expected characteristics for each of the sections so that each of the sections is calibrated independently.

8. The method as set forth in claim 7, wherein the operational aspect of the irrigation system is selected from the group consisting of a speed of the mobile towers, a duty cycle of the water emitters, and a water flow rate of the water emitters.

9. The method as set forth in claim 7, wherein the characteristics of the ground surface include an amount of standing water on the ground surface.

10. The method as set forth in claim 7, wherein the monitoring step is performed with a camera.

11. The method as set forth in claim 7, further comprising generating and sending an alert if the monitored characteristics deviate from the expected characteristics by more than a threshold amount.

12. An irrigation system comprising:
a series of mobile towers each having wheels and a motor for driving the wheels;
support structure for connecting the mobile towers to each other;
a water-carrying conduit supported by the support structure;
a plurality of water emitters connected to the conduit for delivering water to a ground surface;
a plurality of valves for controlling water flow to the water emitters; and
a control system for controlling operation of the mobile tower motors and the valves, the control system programmed to:
  operate the mobile towers in accordance with an irrigation plan to move the irrigation system over a ground surface and to apply selected amounts of fluids to a plurality of sections of the ground surface;
  determine positions of the irrigation system as the irrigation system moves over the ground surface;
  measure operating parameters of a component of the irrigation system as the irrigation system moves over the sections of the ground surface;
  compare the measured operating parameters to expected operating parameters for the determined positions of the irrigation system for each of the sections;
  create a calibration map that reflects differences between the measured operating parameters and the expected operating parameters for each of the sections, the calibration map including a separate correction factor for each of the sections, wherein each of the correction factors accounts for differences between the measured operating parameters and the expected operating parameters for its respective section and not any of the other sections; and
  calibrate operation of the irrigation system with the calibration map by adjusting an operational aspect of the irrigation system for each of the sections in accordance with the separate correction factors for the sections to account for the differences between the measured operating parameters and the expected operating parameters for each of the sections.

13. The irrigation system as set forth in claim 12, wherein the operational aspect of the irrigation system is selected from the group consisting of a speed of the mobile towers, a duty cycle of the water emitters, and a water flow rate of the water emitters.

14. The irrigation system as set forth in claim 12, wherein the control system is positioned on the irrigation system.

15. The irrigation system as set forth in claim 12, wherein the control system is positioned remotely from the irrigation system.

16. The irrigation system as set forth in claim 12, wherein some components of the control system are positioned on the irrigation system and other components of the control system are positioned remotely from the irrigation system.

* * * * *